No. 710,357. Patented Sept. 30, 1902.
W. E. HEAL.
MANUFACTURE OF WINDOW AND PLATE GLASS.
(Application filed Jan. 25, 1902.)
(No Model.) 2 Sheets—Sheet 1.
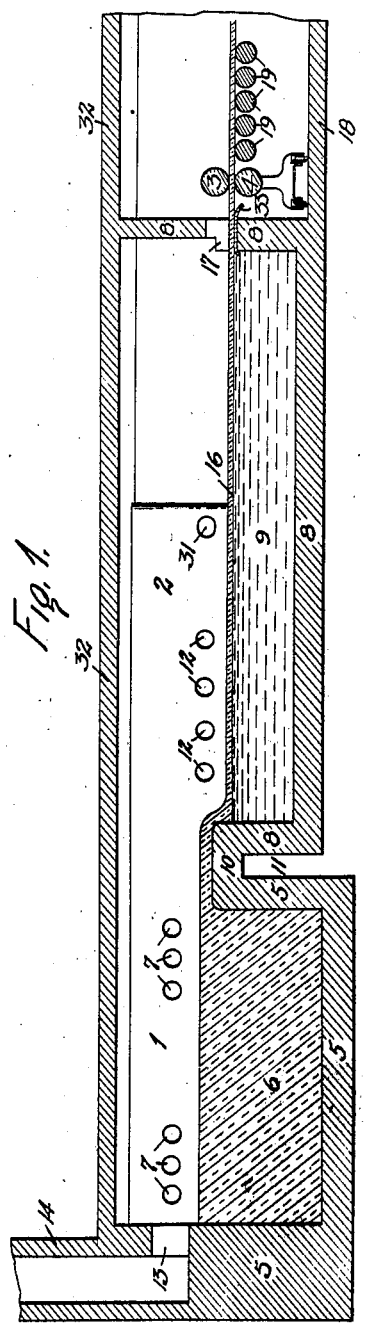
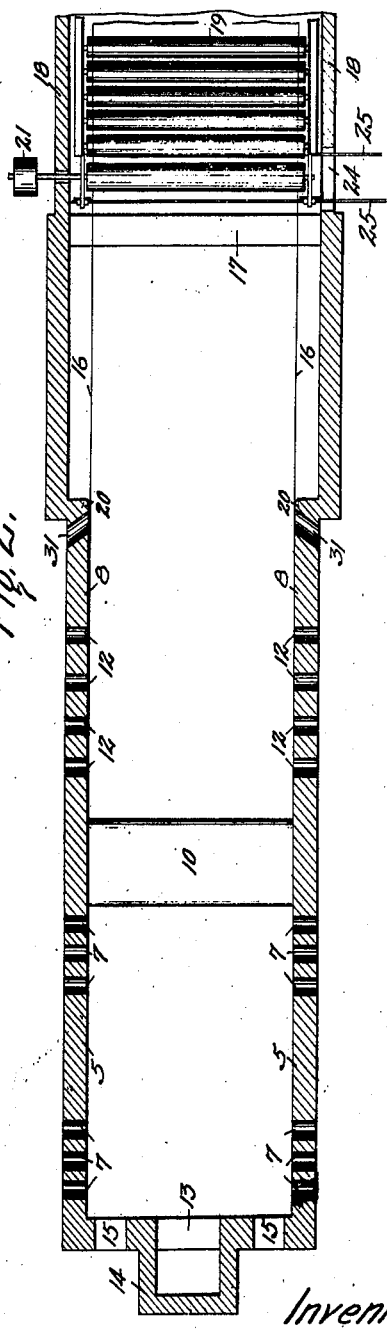

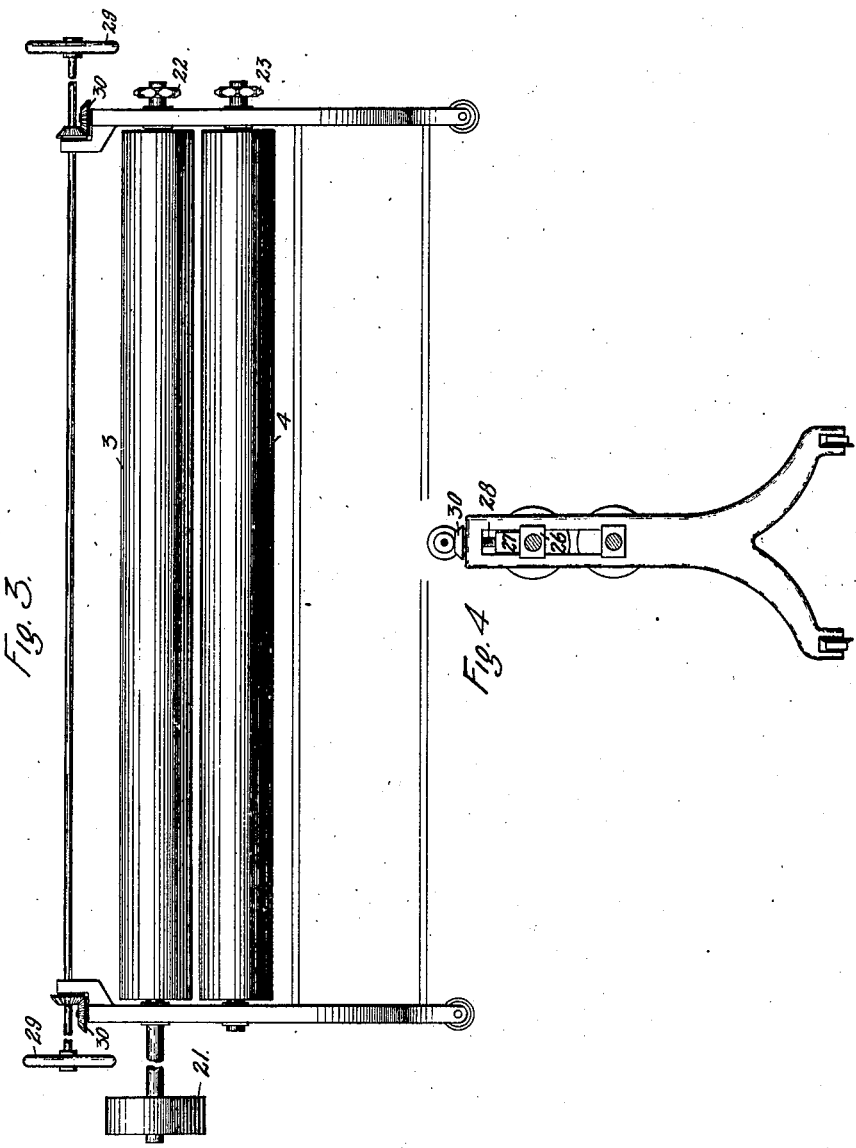

UNITED STATES PATENT OFFICE.

WILLIAM E. HEAL, OF MARION, INDIANA, ASSIGNOR OF ONE-HALF TO JOHN H. FORREST, OF MARION, INDIANA.

MANUFACTURE OF WINDOW AND PLATE GLASS.

SPECIFICATION forming part of Letters Patent No. 710,357, dated September 30, 1902.

Application filed January 25, 1902. Serial No. 91,192. (No specimens.)

*To all whom it may concern:*

Be it known that I, WILLIAM E. HEAL, a citizen of the United States, residing at Marion, in the county of Grant and State of Indiana, have invented a new and useful Improvement in the Manufacture of Window and Plate Glass, of which the following is a description.

My invention relates to the manufacture of sheet and plate glass of any desired thickness and in continuous sheets by a new and improved method of flowing the molten glass from the melting-tank into an adjacent receptacle containing melted material of a greater specific gravity than glass and causing the molten glass to float upon and spread into a continuous sheet over the surface of said melted material and then drawing the sheet of glass therefrom and causing it to pass into the leer for annealing and by one continuous operation, as hereinafter more fully set forth and described, it being my object by this invention to simplify, facilitate, and cheapen the manufacture of sheet and plate glass and improve its quality.

The accompanying drawings illustrate my invention and the preferable apparatus adapted to carry out my new and improved process and method of manufacturing sheet, window, and plate glass, and in these drawings like numerals of reference indicate corresponding parts in all the figures.

Figure 1 is a vertical longitudinal section of the apparatus preferred and adapted to be used in connection with my improved method and process of making sheet, window, and plate glass. Fig. 2 is a sectional plan view of said apparatus. Fig. 3 is a side elevation of the drawing-out rolls and connected parts detached from said apparatus, and Fig. 4 is an end elevation of the same rolls and connected parts.

In the drawings, 5 is a suitable melting-tank inclosing the furnace-chamber 1, and 8 is a suitable forming-tank inclosing the heating-chamber 2, said tanks being connected by the bridge 10 with an open channel 11 between the tanks and beneath the bridge, through which the air may circulate freely under the bridge and between the end walls of the tanks in order to cool and prevent said end walls and bridge from being melted down by the intense heat of said furnace and heating chambers. Said furnace-chamber 1 and said heating-chamber 2 communicate with each other through the open space above the bridge 10, and both chambers have the same roof 32, which also extends over and covers the leer or annealing-room 18.

Gas for melting the glass 6 is admitted through the ports 7 on each side of the furnace and is similarly admitted by the ports 12 into the heating-chamber 2 for the purpose of melting the material 9 in the forming-tank 8 and superfusing the sheet of glass 16 within the heating-chamber. The heat in the chamber 2 is continuous and is supplied from the furnace and by the introduction of gas through the side ports 12 and the supply regulated by suitable regulating devices. The ports 31 on each side of the heating-chamber and near the angles 20 are provided to admit gas for superfusing the edges of the sheet of glass and facilitating its passage from the bridge 10 to and beyond said angles, where the forming-tank and heating-chamber are widened, as shown in the plan view, Fig. 2, to permit the sheet of glass 16 to pass unobstructed by the side walls of the forming-tank to the opening 17 at the end of the heating-chamber 2. The melting-tank 5 is filled with molten glass to the level shown in Fig. 1, and the forming-tank 8 is filled to a somewhat lower level with a suitable molten material, preferably of tin or alloys of tin and copper, but may be of other metal or material having a much greater specific gravity and being much more fusible than glass.

The opening 17 is made of suitable height and width to freely admit passage through it of the sheet of glass of any desired width or thickness capable of being produced in and by the apparatus and method herein described. The openings 15 are provided, through which the batch or material to be made into glass is fed into the melting-tank 5. The flue 13 affords an opening, whereby the smoke, spent gases produced, and vapors generated in the furnace and heating-chamber may escape into the chimney 14 and be carried out into the open air. Situate opposite said opening 17 is a pair of drawing-out rolls 3 and 4, which are more fully shown by Fig. 3, and which are provided and adapted to receive the sheet of glass 16 from the opening 17 and deliver it to the carrying-rolls 19, to be carried thereby through the leer or annealing-oven 18, said leer being connected with the heating-chamber 2 and made continuous therewith, as shown in Figs. 1 and 2. The rolls 3 and 4 are mounted on movable bearings and provided with the sprocket-wheels 22 and 23 and a chain engaging with said wheels, the pulley 21 being adapted to rotate said wheels at any desired speed regulated by any suitable speed-regulating device. The adjustment of the upper roll 3 is effected by means of the movable bearings 26, as shown in Fig. 4, to each of which bearings is rigidly attached on its upper side a nut 27, engaging with a screw-thread on the shaft 28, which is caused to rotate when desired by turning the hand-wheels 29, and thus actuating the bevel-gears 30 and producing the rotary motion of said shaft. By this device the upper roll 3 may be elevated or lowered, as desired, and the space between the rolls 3 and 4 regulated to suit any desired thickness of glass and produce any desired pressure upon the sheets of glass to be passed between said rolls. These rolls are made of iron or other suitable metal or material covered with asbestos cord or rope wound in even and smooth layers around the rolls, as thread is usually wound upon a spool, thus providing a smooth and elastic surface adapted to protect the surface of the glass from injury and at the same time sufficiently firm to grasp and hold the sheet of glass between the rolls and feed it into the leer and pass it to the carrying-rolls of the annealing-oven. At the bottom of the opening 17 and at the end of the heating-chamber 2 is securely placed a mat of asbestos 33 upon the top of the end wall of the forming-tank to prevent injury to the surface of the sheet of glass when passing through the opening to the drawing-out rolls 3 and 4. A door 24 is placed in the side of the leer and through which access may be had to the interior and through which the drawing-out rolls 3 and 4 and supporting-framework thereof may be run out on the track 25.

The drawing-out rolls 3 and 4 and the carrying-rolls 19 may be driven by any suitable driving-gear or other suitable actuating mechanism.

In the manufacture of glass in a continuous sheet by my improved method the well-known qualities of glass are utilized and applied. This is done by using in the forming-tank 8 metals, alloys, or other materials possessing qualities adapted to facilitate the formation, treatment, and handling of the sheet of glass to be produced and passed through the heating-chamber 2. The metals, alloys, and materials preferred for such use are tin and alloys of tin and copper; but other metals, alloys, and materials possessing similar qualities may be used. The metals and alloys specified fuse at a much lower temperature than glass, and their boiling temperature is very high. The specific gravity of glass being much less than said metals, alloys, and materials, the molten sheet of glass will readily float and spread over the surface of the same in their molten state without danger of agitating or distorting said sheet by any boiling of the subjacent contents of the forming-tank 8. Said metals, alloys, and materials are protected by the sheet of glass from oxidation, and between them and the glass there is no affinity or reaction, thus furnishing a level cushion and surface, from which injury to the floating sheet of glass is not liable to occur.

In making sheet, window, and plate glass by my improved method gas is furnished through the ports 7 and the supply regulated by the usual or any suitable method. The glass is heated, melted, and purified in the usual way in the melting-tank 5, and all lumps, unmelted particles, and other impurities held back from the working end of the tank in the usual way and nothing but the pure molten glass permitted to occupy the working end of the melting-tank next to the bridge and flow over the bridge. The batch to be melted is fed into the melting-tank 5 through the openings 15 in such quantities and with such regularity as to maintain the supply of molten glass contained in the melting-tank at a level high enough to cause a uniform flow of the pure molten glass from the melting-tank over the bridge 10 into the forming-tank 8 in quantities as desired. The molten glass after flowing over said bridge flows and spreads over the surface of the molten mass 9 of metal, alloys, or other fused materials above described contained in the forming-tank 8, the surface of said molten mass being maintained at a level enough lower than the top of the bridge 10 to permit the molten glass to flow freely by gravitation from the top of said bridge into said forming-tank. A sufficient number of the ports 7, leading to the furnace-chamber, are located near said bridge in order to supply gas to said chamber at that point and facilitate and intensify the heating of the glass next to said bridge and reduce it to such a state of fluidity as to cause it to flow freely over said bridge as desired. Through the ports 12 in the walls of the heating-chamber 2 gas is supplied as needed to heat and melt the glass to such a state of fluidity in said forming-tank as to cause it to flow and spread as desired over the surface of the molten mass in said forming-tank, and particularly between said bridge and the angles 20 in the side walls of said heating-chamber. Near said angles gas is supplied through the ports 31 to heat and liquefy the edges of the sheet of glass between said side walls and prevent its adherence thereto and free it therefrom and enable the sheet to flow or be drawn forward detached and free from said side walls, toward the opening 17 in said forming-tank and through the wider portion of said heating-chamber between said angles and said opening to and through said opening. The initial drawing of the sheet of glass from the forming-tank 8 is effected by raking it to and through said opening and carrying the end of the sheet to and placing said end within the grasp of the revolving drawing-out rolls 3 and 4, by which the continuous sheet of glass is then drawn from the forming-tank and heating-chamber and passed to the carrying-rolls 19 and by them sent forward through the leer or annealing-oven and annealed in the usual way. Said drawing-out rolls being covered with asbestos and adjustable to any desired pressure upon the sheet of glass passing between them and their speed regulated as herein described, the sheet is protected from injury and may be held by ample pressure to draw out the sheet at any desired speed. By the operation of the drawing-out rolls a continuous sheet of glass is drawn from the forming-tank and retains its form and shape through the cooling of the glass as it passes to said rolls. The well-known tenacity and viscosity of glass, its less fusibility than the metals, alloys, and materials herein described, and its tendency when fused to spread freely and evenly and cover in uniform thickness any surface over which it flows adapt it to the process of manufacturing glass herein set forth. The greater fusibility of said metals, alloys, and materials and their greater specific gravity than glass render it easy and practicable to form the sheet on the surface of the molten mass 9 in the forming-tank 8, as described, and by varying the temperature in the heating-chamber 2 the flow of the sheet may be accelerated or retarded in proportion to the varying degree of fluidity of the glass thus produced, and in this way the proper consistency of the glass may be maintained for forming and drawing out the sheet by the drawing-out rolls 3 and 4. The speed of these rolls being regulated by a suitable speed-regulating mechanism, the drawing of the sheet of glass from the forming-tank 8 may be so regulated as to remove the sheet as fast as formed in the tank and the tension on the molten sheet so controlled and regulated as to draw the sheet in its semiplastic state to any desired thickness.

The molten sheet of glass when formed upon the surface of the subjacent sheet of metal is by reducing the temperature of the heating-chamber 2 cooled to such condition as to be drawn from said chamber and is further cooled by such drawing to render the sheet sufficiently firm to be drawn out of said chamber and passed between the drawing-out rolls and fed to the carrying-rolls 19 without injury to the sheet. The molten contents of the tank on which the sheet of glass floats does not oxidize beneath the sheet nor injure the surface nor blur the polish of the glass.

By the improved method herein described the drawing of the sheet of glass from the forming-tank does not affect the molecular structure of the sheet in a way to produce internal strain in the sheet and liability to fracture from that cause, the process of flattening is dispensed with, and the grinding and polishing process in the manufacture of plate-glass obviated, and the labor cost of production greatly reduced.

The formation of the sheet of glass by flowing the molten glass over the subjacent surface of the molten contents of the forming-tank insures uniform thickness of the sheet and smooth and perfectly plane surfaces throughout, with the brilliant surface polish characteristic of glass when cooled after exposure to intense heat, and the production of sheet or plate glass by the improved method herein described may be accomplished in sheets of any desired width within the extreme internal width of the tank used and in continuous sheets of any length.

It is not intended hereby to limit my invention to the particular apparatus shown by the use of which my improved method of manufacturing glass is carried out as herein described.

What I claim, and desire to secure by Letters Patent, is—

1. The method of forming glass into sheets, or plates, by melting the glass and flowing and floating it, in its melted state, over the surface of melted metal, substantially as described.

2. The method of forming glass into sheets, or plates, consisting in melting the glass and flowing and floating it over the surface of melted metal, substantially as described.

3. The method of forming glass into sheets and plates, consisting in melting the glass and flowing and floating it over the surface of melted metal, and removing the sheet or plate, as formed, from said surface, substantially as described.

4. The method of forming glass into continuous sheets, by melting the glass and producing a regular flow of the melted glass into a sheet over the surface of melted metal, and, with corresponding regularity, removing the sheet, as formed, from said surface, substantially as described.

5. The method of forming glass into continuous sheets, consisting in melting the glass, and producing, by the application of heat, a regular flow of the glass into a sheet over the surface of melted metal, and, with corresponding regularity, removing the sheet, as formed, from said surface, substantially as described.

6. The herein-described process of manufacturing sheet-glass, consisting in melting glass in a suitable tank, and flowing the melted glass from such tank to and over the surface of melted metal contained in a suitable tank, and floating the melted glass on said surface until the same forms, by gravitation, into a sheet of uniform thickness, and then removing the sheet from said surface, as and for the purposes specified.

7. The method of manufacturing glass into continuous sheets, by the use of a pair of tanks, consisting in melting the glass in one of said tanks and maintaining in the other a supply of melted metal, and gradually flowing the melted glass from the tank wherein melted to and over the surface of the melted contents of the other tank, and flowing and floating the melted glass into a sheet upon said surface, and gradually removing said sheet as formed from said surface, substantially as described, and as and for the purposes specified.

8. The method herein described, of manufacturing glass into sheet form, consisting in melting the glass in a suitable tank and flowing the melted glass from such tank to and over the surface of the melted contents of a corresponding tank adapted to receive such flow of glass, and support and float the same, and permit it to spread into a sheet over said surface; and when said sheet is so formed, removing the same, as and for the purposes specified.

9. The method of manufacturing glass into sheets and plates, consisting in melting the glass in a suitable tank, and flowing the melted glass therefrom to and over the surface of melted metal contained in a suitable receptacle, and floating the melted glass on said surface until the same forms, by gravitation and the application of heat, into a sheet of uniform thickness, and then removing the sheet from said surface, substantially as described.

10. The method of manufacturing glass in continuous sheets, consisting in melting the glass in a suitable tank, and flowing the melted glass gradually to and over the surface of the melted contents of a corresponding tank, and floating and spreading said melted glass into a sheet over said surface, and removing the sheet gradually, as formed from said surface, substantially as described, and as and for the purposes specified.

11. The method herein described of forming glass into sheets and plates, consisting in melting the glass in a suitable tank and flowing the melted glass therefrom to and over the melted contents of a corresponding tank, said melted contents being of greater specific gravity than glass, and floating and spreading said molten glass, by the combined action of gravitation and heat, into a sheet over and upon the surface of said melted contents, and removing the sheet thus formed, as and for the purposes specified.

12. The method of manufacturing sheet-glass by one continuous operation, consisting in melting the glass in a suitable tank and flowing the melted glass, under continuous heat, from said tank into a corresponding tank and over the surface of melted metal therein contained, flowing and floating the glass into a sheet over said surface, drawing and forming the sheet of glass, and cooling the sheet in said drawing and forming operation, substantially as described, and for the purposes specified.

13. The herein-described method of manufacturing annealed sheet-glass by one continuous operation, consisting in melting the glass in a suitable tank, flowing the melted glass therefrom to and over the surface of melted metal contained in a suitable receptacle, floating the melted glass and spreading it into a sheet on said surface, and subjecting it to continuous heat for regulating the softness of the glass, and keeping said metal melted, drawing and forming the sheet of glass, cooling the glass in said drawing and forming operation, and annealing the sheet of glass, as and for the purposes specified.

14. The method of manufacturing glass into a continuous sheet, consisting in feeding the glass into a suitable melting-tank, melting the glass therein, flowing the melted glass therefrom into a suitable receptacle containing melted metal, floating and spreading the glass in a sheet over the surface of said metal by the simultaneous action of heat and gravitation, forming and drawing the sheet of glass, and cooling the sheet in the forming and drawing operation, substantially as described, and as and for the purposes specified.

15. The method of manufacturing annealed glass in a continuous sheet, consisting in melting the glass in a suitable tank, flowing the glass as melted into a suitable receptacle containing melted metal, floating and spreading the melted glass over the surface of the melted contents of said receptacle by the simultaneous action of heat and gravitation, drawing and forming the sheet of glass, cooling the sheet in the forming and drawing operation, and annealing the sheet of glass substantially as described, and as and for the purposes specified.

16. The method of manufacturing glass in a continuous sheet, which consists in melting the glass in a suitable tank, flowing the melted glass therefrom into a suitable receptacle containing melted metal of greater specific gravity than glass, spreading and floating the melted glass, by the combined action of heat and gravitation, over the surface of said melted metal, cooling the glass to a proper consistency and tenacity for drawing, and applying tractive force thereto to form and draw the sheet from said surface, cooling the sheet in said drawing and forming operation, substantially as described, and as and for the purposes specified.

In testimony whereof I have signed my name to this specification in the presence of two subscribing witnesses.

WILLIAM E. HEAL.

Witnesses:
JOHN H. FORREST,
JOHN WILSON.